United States Patent
Yoshida (10) Patent No.: US 8,570,592 B2
(45) Date of Patent: Oct. 29, 2013

(54) METHOD OF CREATING LOOKUP TABLE, PRINTING APPARATUS, LOOKUP TABLE, AND PRINTING METHOD

(75) Inventor: Seishin Yoshida, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 768 days.

(21) Appl. No.: 12/685,634

(22) Filed: Jan. 11, 2010

(65) Prior Publication Data

US 2010/0177131 A1    Jul. 15, 2010

(30) Foreign Application Priority Data

Jan. 13, 2009   (JP) .................................. 2009-004902

(51) Int. Cl.
*H04N 1/40* (2006.01)
*B41J 29/38* (2006.01)

(52) U.S. Cl.
USPC ............. 358/1.9; 358/3.23; 358/518; 347/14; 347/15; 347/19

(58) Field of Classification Search
USPC ........ 358/1.9, 3.01, 3.21, 3.23, 518; 347/5, 9, 347/14, 15, 19, 100
See application file for complete search history.

(56) References Cited

U.S. PATENT DOCUMENTS

| | | | |
|---|---|---|---|
| 6,079,824 A * | 6/2000 | Gotoh | 347/100 |
| 6,655,798 B2 | 12/2003 | Temple | |
| 7,101,009 B2 * | 9/2006 | Kakutani | 347/15 |
| 7,682,015 B2 | 3/2010 | Hoshino | |
| 2005/0185011 A1 * | 8/2005 | Kakutani | 347/19 |
| 2006/0285890 A1 | 12/2006 | Ng | |
| 2007/0188541 A1 | 8/2007 | Hoshino | |
| 2007/0273738 A1 * | 11/2007 | Tsuchiya | 347/100 |
| 2010/0177354 A1 * | 7/2010 | Yoshida | 358/3.01 |
| 2010/0177357 A1 * | 7/2010 | Yoshida | 358/3.21 |
| 2011/0001993 A1 * | 1/2011 | Kato et al. | 358/1.9 |
| 2012/0050362 A1 * | 3/2012 | Iritani et al. | 347/9 |

FOREIGN PATENT DOCUMENTS

| | | |
|---|---|---|
| JP | 2002-530229 A | 9/2002 |
| JP | 2002-331708 A | 11/2002 |
| JP | 2004-291268 A | 10/2004 |
| JP | 2004-310355 A | 11/2004 |
| JP | 2005-042199 A | 2/2005 |
| JP | 2005-052984 A | 3/2005 |
| JP | 2005-231350 A | 9/2005 |
| WO | WO 00/30856 A1 | 6/2000 |

* cited by examiner

*Primary Examiner* — Kimberly A Williams
(74) *Attorney, Agent, or Firm* — Kilpatrick Townsend & Stockton LLP (57) ABSTRACT

A method of creating a lookup table which describes a correspondence relationship between an input value to a printing apparatus for performing printing by ejecting ink onto a printing medium, and output values of a special gloss ink and a color ink of the printing apparatus, includes: a first process of determining the output value of the special gloss ink to be relatively low at a lattice point where an index value relating to color intensity is dark to be equal to or lower than a predetermined value, with regard to each lattice point of the lookup table; and a second process of determining the output value of the color ink at each lattice point by increasing an ink duty limit value which is the upper limit of the sum of the color ink that can be ejected onto a unit area of the printing medium, according to the determined output value of the special gloss ink.

8 Claims, 6 Drawing Sheets

METHOD OF CREATING LOOKUP TABLE, PRINTING APPARATUS, LOOKUP TABLE, AND PRINTING METHOD

BACKGROUND

1. Technical Field

The present invention relates to a printing technique for performing printing by ejecting a special gloss ink and a color ink onto a printing medium.

2. Related Art

In general, there is known a method of forming an undercoat layer on a printing medium and then printing on the undercoat layer (for example, refer to JP-T-2002-530229). Such a method can be used for various printing methods. For example, it can be used for a case where a variety of metallic colors are to be reproduced. In order to reproduce metallic colors, for example, a metallic ink layer is formed on a printing medium and a color ink is overlapped thereon to be printed.

Another example of the above-described related art is disclosed in JP-A-2005-52984.

However, in an ink jet printer, when an ink duty of color ink is relatively high, the duty limitation becomes unnecessarily severe for the amount of metallic ink overlapped. As a result, there is a problem in that the color reproduction range narrows. This problem is not limited to metallic inks containing metal pigments for expressing metallic gloss feel, and is common to, for example, cases where a variety of special gloss inks for expressing textures in addition to colors are used, such as inks containing pigments for expressing a gloss feel similar to pearly gloss.

SUMMARY

An advantage of some aspects of the invention is that it provides a printing apparatus for performing printing using a special gloss ink and a color ink, which suitably widens the color reproduction range of a printing region with a high ink duty.

The invention has been made to solve at least a part of the problems and can be realized as the following embodiments or Applications.

First Application

There is provided a method of creating a lookup table which describes a correspondence relationship between an input value to a printing apparatus for performing printing by ejecting ink onto a printing medium, and output values of a special gloss ink and a color ink of the printing apparatus, the method including: a first process of determining the output value of the special gloss ink to be relatively low at a lattice point where an index value relating to color intensity is dark to be equal to or lower than a predetermined value, with regard to each lattice point of the lookup table; and a second process of determining the output value of the color ink at each lattice point by increasing an ink duty limit value which is the upper limit of the sum of the color ink that can be ejected onto a unit area of the printing medium, according to the determined output value of the special gloss ink.

In the method of creating a lookup table, the output value of the special gloss ink is reduced at a lattice point where the index value is dark to be equal to or lower than the predetermined value, and the ink duty limit of color ink is increased to determine the output values of the special gloss ink and the color ink. Therefore, at a lattice point where the index value is dark, that is, at a lattice point where the output value of color ink is relatively high, the output value of the color ink is allowed to be high by the increment in the ink duty limit of color ink. As a result, it is possible to widen the color reproduction range of the printing region. In addition, since the amount of color ink to be used is high in the printing area of the corresponding lattice points, a special gloss expression effect due to the special gloss ink is originally small. Therefore, although the output value of the special gloss ink is reduced, this does not have a significant effect on printing quality. In addition, it is possible to conserve the amount of the metallic ink, which is relatively expensive, while considering the printing quality.

Second Application

In the method of creating a lookup table according to First Application, in the first process, the output value of the special gloss ink is reduced at a lattice point where the index value is dark to be equal to or lower than the predetermined value, as the index value is darker, and in the second process, the ink duty limit value is increased as the index value is darker.

In the method of creating a lookup table, the output value of the special gloss ink is reduced and the ink duty limit value of color ink is simultaneously increased with the degree of darkness of the index value. Therefore, when printing is performed by using the lookup table created by the method, gradation change in the printed image becomes smooth, and it is possible to suppress the degradation in printing quality.

Third Application

In the method of creating a lookup table according to First or Second Application, the method further includes: a first color measurement process of performing color measurement on the index value for each predetermined color gradation in a printing region printed by using only the color ink; a second color measurement process of performing color measurement on the index value for each predetermined color gradation in a printing region printed by using the color ink and the special gloss ink; and a process of obtaining an intersection index value which is the index value at an intersection between a line representing a relationship between the color gradation and the index value obtained in the first color measurement process and a line representing a relationship between the color gradation and the index value obtained in the second color measurement process, wherein the predetermined value is a dark value to be equal to or less than the intersection index value.

In the method of creating a lookup table, the output value of the special gloss ink is reduced in a region where the index value is dark to be equal to or lower than the intersection index value. Therefore, when printing is performed by using the lookup table created by the method, a relationship between the color gradation value and the index value can be maintained such that the index value is reduced as the color gradation value of the printing region is increased. Accordingly, before and after the color gradation where the amount of the special gloss ink to be used is reduced, change in intensity gradation becomes smooth, so that it is possible to suppress the degradation in printing quality.

Fourth Application

In the method of creating a lookup table according to First to Third Applications, the index value is brightness.

In the method of creating a lookup table, the index value may be brightness. In addition, as well as the brightness, luminance, ink duty, and the like may be employed.

Fifth Application

In the method according to Fourth Application, the brightness is a value measured at a light-receiving angle of 0 degrees and an illumination angle of −45 degrees.

In the method of creating a lookup table, a measurement condition of brightness may be a light-receiving angle of 0 degrees and an illumination angle of −45 degrees. In this case, a range of relatively reducing the special gloss ink can be determined with precision close to the discrimination ability of the human eye.

In addition, the invention can be implemented as a printing apparatus of Sixth Application, a lookup table of Seventh Application, a printing method of Eighth Application, and the like, as well as the method of creating a lookup table.

Sixth Application

There is provided a printing apparatus including: a storage unit that stores the lookup table created by the method of creating a lookup table according to any one of First to Fifth Applications; a color conversion unit that performs a color conversion process of converting the input value into the output value by using the stored lookup table; and a print unit that performs printing by using a result of the color conversion process.

Seventh Application

There is provided a lookup table which describes a correspondence relationship between an input value to a printing apparatus for performing printing by ejecting ink onto a printing medium and output values of a special gloss ink and a color ink of the printing apparatus, wherein the output value of the special gloss ink is relatively reduced, and the sum of the output value of the color ink is increased at a lattice point where an index value relating to color intensity is dark to be equal to or lower than a predetermined value.

Eighth Application

There is provided a printing method of performing printing using a special gloss ink and a color ink, including: in a printing region where an index value relating to color intensity is dark to be equal to or lower than a predetermined value, relatively reducing the amount of the special gloss ink to be used; and increasing the sum of the amount of the color ink to be used.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Overview of Printing Apparatus

Figure 1:
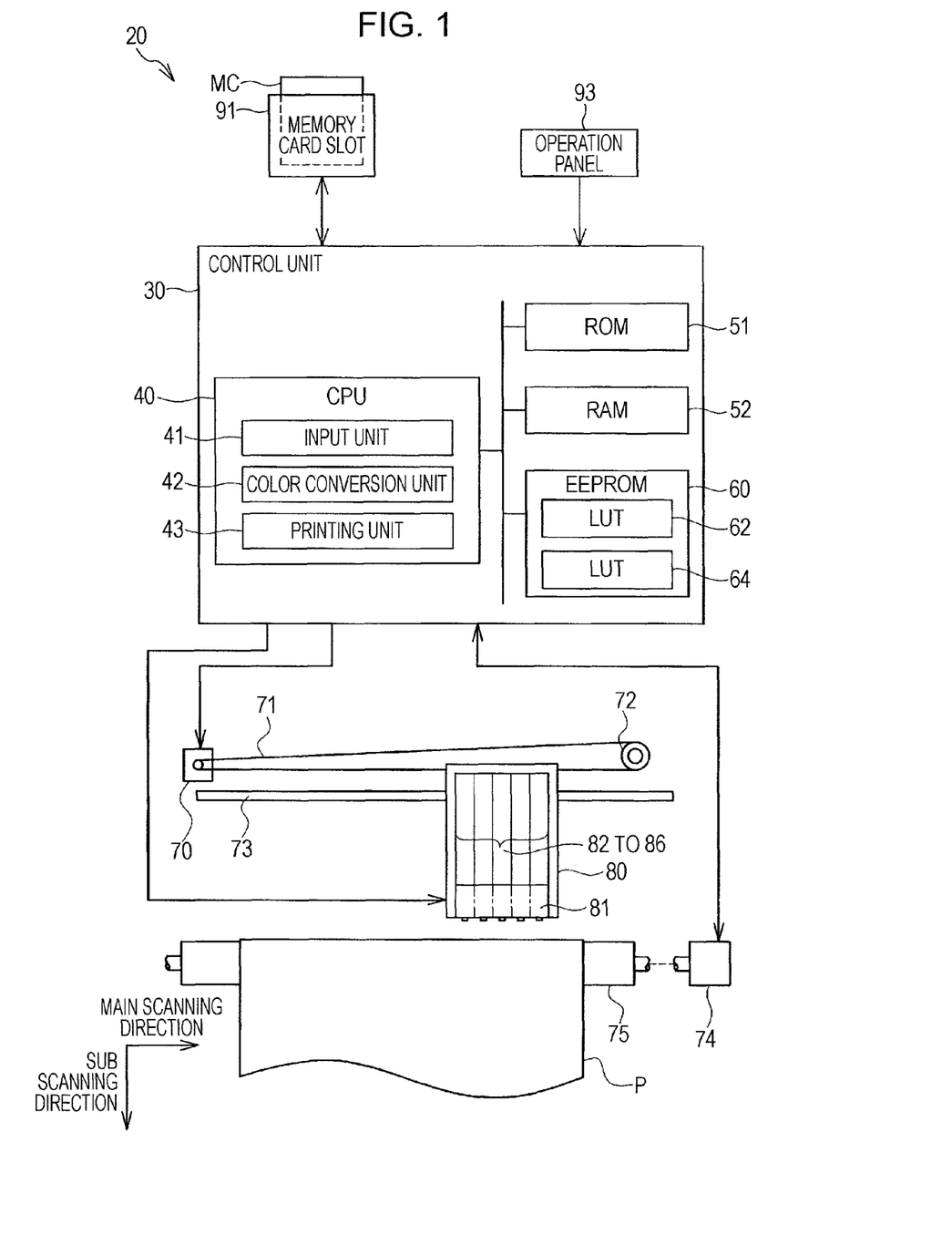
FIG. 1 is a diagram schematically illustrating a configuration of a printer according to an embodiment of the invention.

FIG. 1 is a diagram schematically illustrating a configuration of a printer 20 according to an embodiment of the invention. As illustrated in FIG. 1, the printer 20 includes a mechanism for transporting a printing medium P by a paper feed motor 74, a mechanism for reciprocating a carriage 80 in an axial direction of a platen 75 by a carriage motor 70, a mechanism for ejecting inks and forming dots by driving a print head 81 mounted in the carriage 80, and a control unit 30 for signal transmission/reception between the paper feed motor 74, the carriage motor 70, the print head 81, and an operation panel 93.

The mechanism for reciprocating the carriage 80 in the axial direction of the platen 75 is provided in parallel with the axis of the platen 75, and includes a sliding shaft 73 for holding the carriage 80 to slide, a pulley 72 with which an endless drive belt 71 runs between the carriage motor 70 and the pulley 72, and the like.

Ink cartridges 82 to 85 for color inks which respectively contain cyan ink C, magenta ink M, yellow ink Y, and black ink K as color inks are mounted in the carriage 80. In addition, an ink cartridge 86 for metallic ink which contains metallic ink S is mounted in the carriage 80. According to the embodiment, the ink cartridges 82 to 86 are arranged in order of C, M, Y, K, and S from the left of FIG. 1. A print head 81 provided at a lower portion of the carriage 80 is provided with nozzle rows corresponding to the color inks and the metallic ink S described above. When the ink cartridges 82 to 86 are loaded in the carriage 80 from above, ink can be supplied to the print head 81 from each cartridge.

In this embodiment, "color ink" includes the black ink. In addition, in this embodiment, color ink uses pigment ink.

Metallic ink is an ink for allowing a printed matter to express a metallic feel, and for example, an oil-based ink composition containing a metal pigment, an organic solvent, and a resin may be used as the metallic ink. In order to effectively visualize metallic texture, it is preferable that the metal pigment described above have plate-like particles, and assuming that a major diameter of the plate-like particle in a plane is X, a monitor diameter thereof is Y, and a thickness thereof is Z, it is preferable that a 50% average particle diameter R50 be in the range of 0.5 to 3 μm as the circle-equivalent diameter obtained from an area of an X-Y plane of the plate-like particle and a condition of R50/Z>5 be satisfied. The metal pigment may be made of aluminum or an aluminum alloy and may also be made by fracturing a metal deposition layer. A concentration of the metal pigment contained in the metallic ink is, for example, in a range of 0.1 to 10.0 wt. %. Of course, the metallic ink is not limited to such a composition, and may suitably employ other compositions as long as the composition expresses a metallic feel.

In this embodiment, the composition of the metallic ink S includes 1.5 wt. % of aluminum pigment, 20 wt. % of glycerin, 40 wt. % of triethylene glycol monobutyl ether, and 0.1 wt. % of BYK-UV3500 (manufactured by BYK-Chemie Japan K.K.)

The control unit 30 is configured by connecting the CPU 40, the ROM 51, the RAM 52, and the EEPROM 60 via a bus. The control unit 30 also functions as an input unit 41, a color conversion unit 42, and a printing unit 43 by deploying and executing programs stored in the ROM 51 or the EEPROM 60 on the RAM 52. The details of those function units are described later.

The control unit 30 is connected to a memory card slot 91 and reads and input image data ORG from a memory card MC inserted into the memory card slot 91. In this embodiment, the image data ORG input from the memory card MC is data made from three color components for red (R), green (G), and blue (B).

In addition, the control unit 30 may receive an instruction from a user through the operation panel 93 or the like and designate a region (hereinafter, referred to as a "metallic region") composed of metallic color besides regions (hereinafter, referred to as "color regions") composed of R, G, and B color components, with respect to an arbitrary region in the input image data ORG. The metallic region and the color region may be designated to overlap with each other (the overlapping region is referred to as a "metallic color region", a region composed of only R, G, and B color components is referred to as a "color-only region", and a region composed of only metallic color is referred to as a "metallic-only region"). That is, an area may be designated to allow printing to mix dots formed of color ink and dots formed of metallic ink together in the same region.

The EEPROM 60 stores a lookup table (LUT) 62 in which a relationship between an input value in an RGB form and an output value in a CMYKS form is described, and a LUT 64 in which a relationship between an input value in an RGB form and an output value in a CMYK form is described.

The printer 20 having the above-mentioned hardware configuration reciprocates the print head 81 in a main scanning direction with respect to the printing medium P by driving the carriage motor 70 and moves the printing medium P in a sub scanning direction by driving the paper feed motor 74. The control unit 30 drives the nozzles at the right timing on the basis of the print data according to the reciprocation movement (main scanning) of the carriage 80 and the transportation movement (sub scanning) of the printing medium as a paper to form ink dots of suitable colors at suitable positions on the printing medium P. Accordingly, the printer 20 can print a color image input from the memory card MC on the printing medium P.

B. Printing Process

Figure 2:
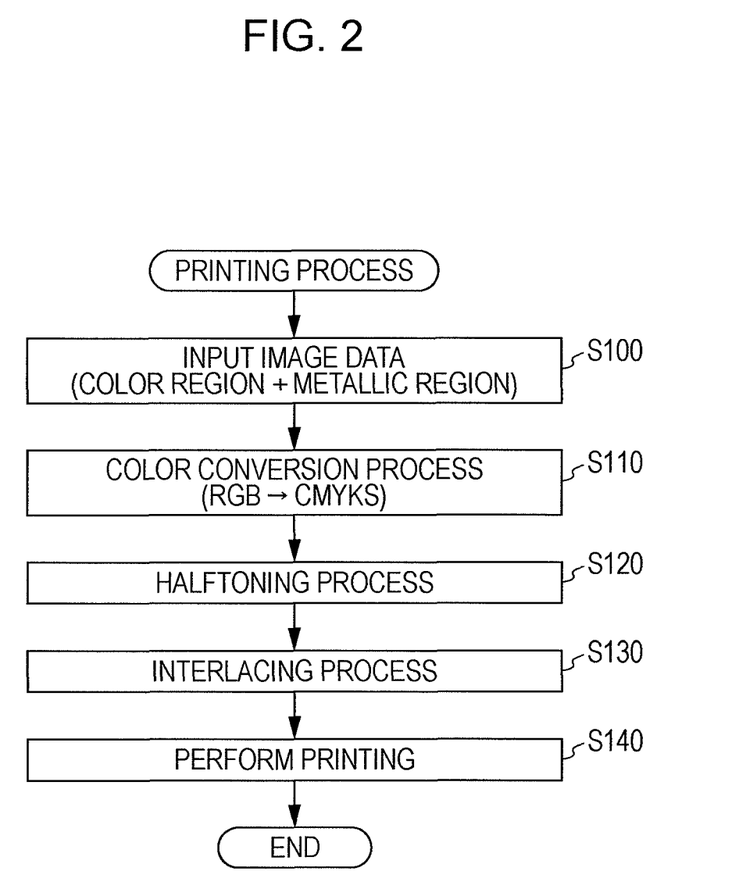
FIG. 2 is a flowchart of a printing process of the printer.

A printing process of the printer 20 will be described. FIG. 2 is a flowchart of a printing process according to this embodiment. The printing process is a process for printing metallic colors and is started when the user operates a print instruction of a predetermined image stored in the memory card MC using the operation panel 93. In this embodiment, the user operates the print instruction and designates a metallic region for an image to be printed. When the printing process is started, the CPU 40, first, as a process of the input unit 41, reads the image data ORG in an RGB form to be printed from the memory card MC through the memory card slot 91 and inputs image data including color regions and metallic regions (Step S100).

When the image data is input, as a process of the color conversion unit 42, the CPU 40 converts the image data ORG into image data in a CMYKS form that can be expressed by the printer 20 on the basis of the LUTs 62 and 64 stored in the EEPROM 60 (Step S110). In this embodiment, the CPU 40 performs a color conversion process using the LUT 62 for the metallic regions (metallic color region and metallic-only region) and the LUT 64 for the color-only region. In addition, the LUTs 62 and 64 may be stored in other storage media, for example, a hard disk drive, or may be downloaded from a computer or the like connected to the printer 20.

When the color conversion process is performed, the CPU 40 performs a halftoning process of converting the image data to be subjected to the color conversion process into ON/OFF data of a dot of each color (Step S120). Here, a well-known systematic dither method is used. When the halftoning process is performed, the CPU 40 performs an interlacing process of re-arranging the data into dot pattern data to be printed in units of one main scanning according to a nozzle arrangement and a paper feed amount of the printer 20 (Step S130). When the interlacing process is performed, as a process of the print unit 43, the CPU 40 drives the carriage motor 70, the motor 74, the print head 81, and the like according to the dot pattern data and ejects the metallic ink S and the color ink from the print head 81 to perform printing of metallic color (Step S140). Then, the printing process is terminated.

C. Characteristics of LUT 62

Figure 3:
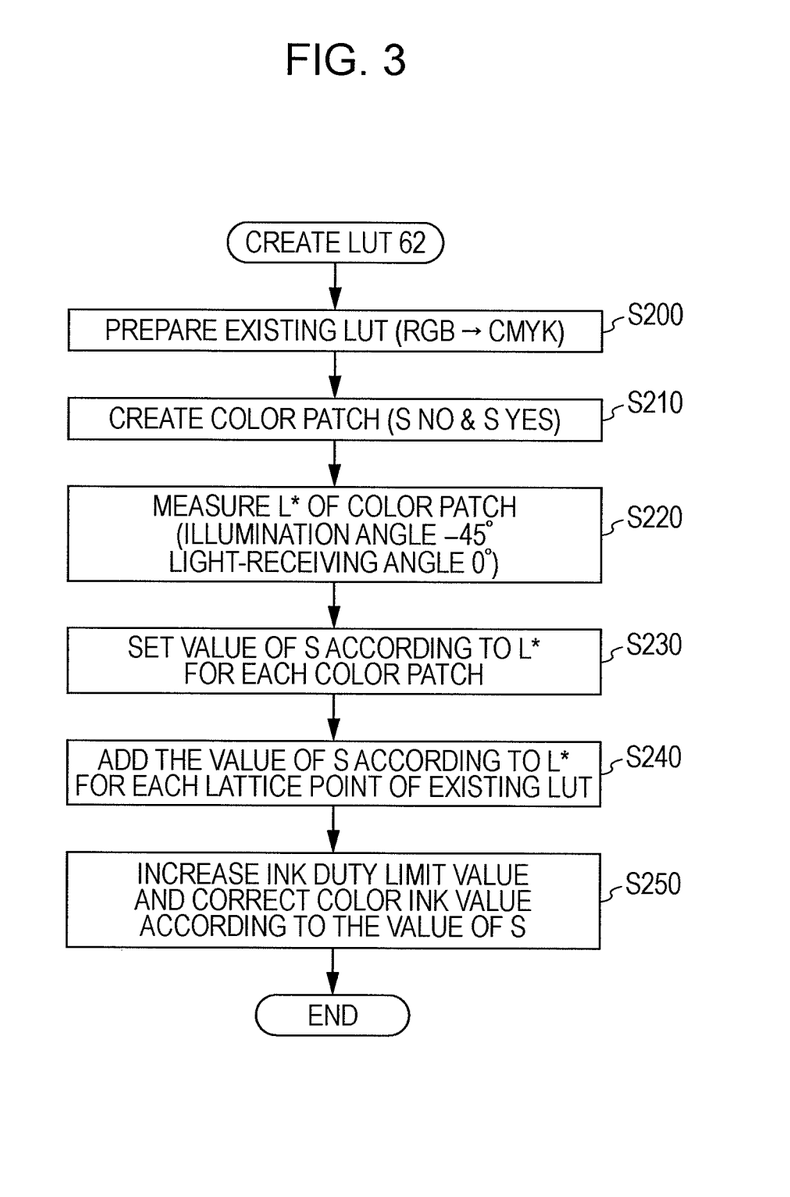
FIG. 3 is a flowchart of a method of creating a LUT.

Characteristics of the LUT 62 are clarified by describing a method of creating the LUT 62 used for the above-mentioned printing process. A flow of the method of creating the LUT 62 is shown in FIG. 3. The creating of the LUT 62 is performed as shown in FIG. 3 as follows. First, an existing LUT describing a correspondence relationship between an input value in an RGB form and an input value of a CMYK form is prepared (step S200). That is, an LUT describing (without describing an output value of metallic ink S) only a correspondence relationship between an input value and an output value of color ink is prepared.

The LUT prepared in this case is for creating the LUT 62 used for performing printing by overlapping the color ink and the metallic ink S, and so it is an LUT created by reducing an ink duty limit value of color ink by the amount of the overlapped metallic ink S, as compared with an existing LUT created under a condition that does not include metallic ink S in an output value. The ink duty limit value of color ink is the upper limit of the sum of color ink that can be ejected onto a unit area of the printing medium. In the ink jet printer, when a large amount of ink is ejected onto a unit area of a printing medium, an ink blur occurs, and suitable color expression cannot be achieved. Therefore, such a limit is provided. In addition, the ink duty limit value is different according to printing conditions such as the printing medium and the kind of ink.

When the existing LUT is prepared, a color patch that does not use the metallic ink S and a color patch that uses the metallic ink S are created (Step S210). Here, the color patch is obtained by performing a color conversion process on image data having predetermined colors of which gradation changes at a predetermined pitch using the existing LUT and printing the image data using the printer 20. The color patch that does not use the metallic ink S is a color patch composed of only color regions and in this embodiment of the invention, is referred to as an only color patch. The color patch that uses the metallic ink S is a color patch that overlaps the metallic ink S on the only color patch at a predetermined duty and, in this embodiment of the invention, is referred to as an overlap color patch. In this embodiment, the overlap color patch is formed by overlapping the metallic ink S at an ink duty of 30%.

Here, the ink duty is set to 30% because the metallic feel expressed by the metallic ink S can be visually recognized best at the ink duty of 30% in the printing condition of this embodiment. However, the ink duty is not limited thereto. The ink duty of the metallic ink S may be set as a reference setting value to overlap the metallic ink S.

In addition, in this embodiment, as described above, the color patch is created by performing printing using the printer 20 that loads the LUT 62 for creation. This is because the performance of the LUT 62 created by the following method is enhanced by creating the color patch under the condition of using the LUT 62. Here, the color patch is not necessarily created by using the printer 20.

Figure 4:
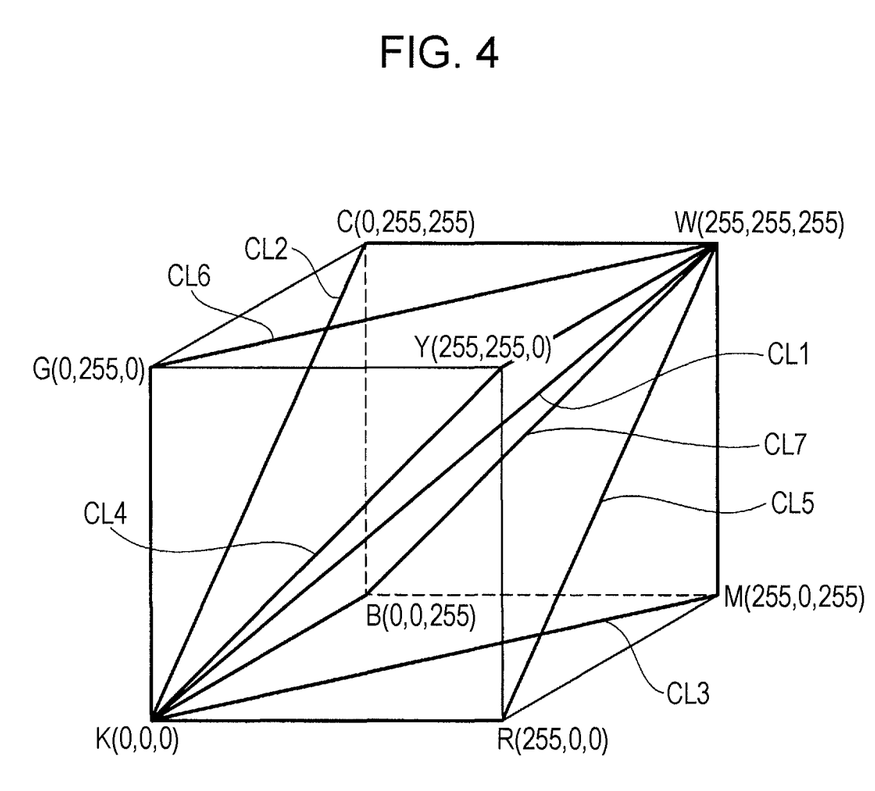
FIG. 4 is an RGB color space showing predetermined colors for creating a color patch.

In this embodiment, the predetermined colors of the color patch are, as illustrated in FIG. 4, from among 8 points K(0, 0, 0), W(255, 255, 255), R(255, 0, 0), G(0, 255, 0), B(0, 0, 255), C(0, 255, 255), M(255, 0, 255), and Y(255, 255, 0) of the RGB color space (gradation values 0 to 255) related to an input value of the printer 20, colors of a color line CL1 linearly connecting the points K and W, a color line CL2 linearly connecting the points K, C, and W, a color line CL3 linearly connecting the points K, M, and W, a color line CL4 linearly connecting the points K, Y, and W, a color line CL5 linearly connecting the points K, R, and W, a color line CL6 linearly connecting the points K, G, and W, and a color line CL7 linearly connecting the points K, B, and W. In addition, the color gradation change pitch of the color patch is determined to divide each color line by 32 stages. In this embodiment, with regard to any color line, the color gradation value 1 is W(255, 255, 255), and the color gradation value 32 is K(0, 0, 0).

When the color patch is created, for the only color patch and the overlap color patch, brightness (L*) of each color gradation is measured using a colorimeter (Step S220). In this embodiment, L* was measured at an illumination angle of −45 degrees and a light-receiving angle of 0 degrees. This is because it was found that in this color measurement condition, a measurement result that is substantially similar to a color gradation change recognizable by the human eye is obtained. Here, the color measurement condition is not limited to this condition and may be suitably modified.

Figure 5:
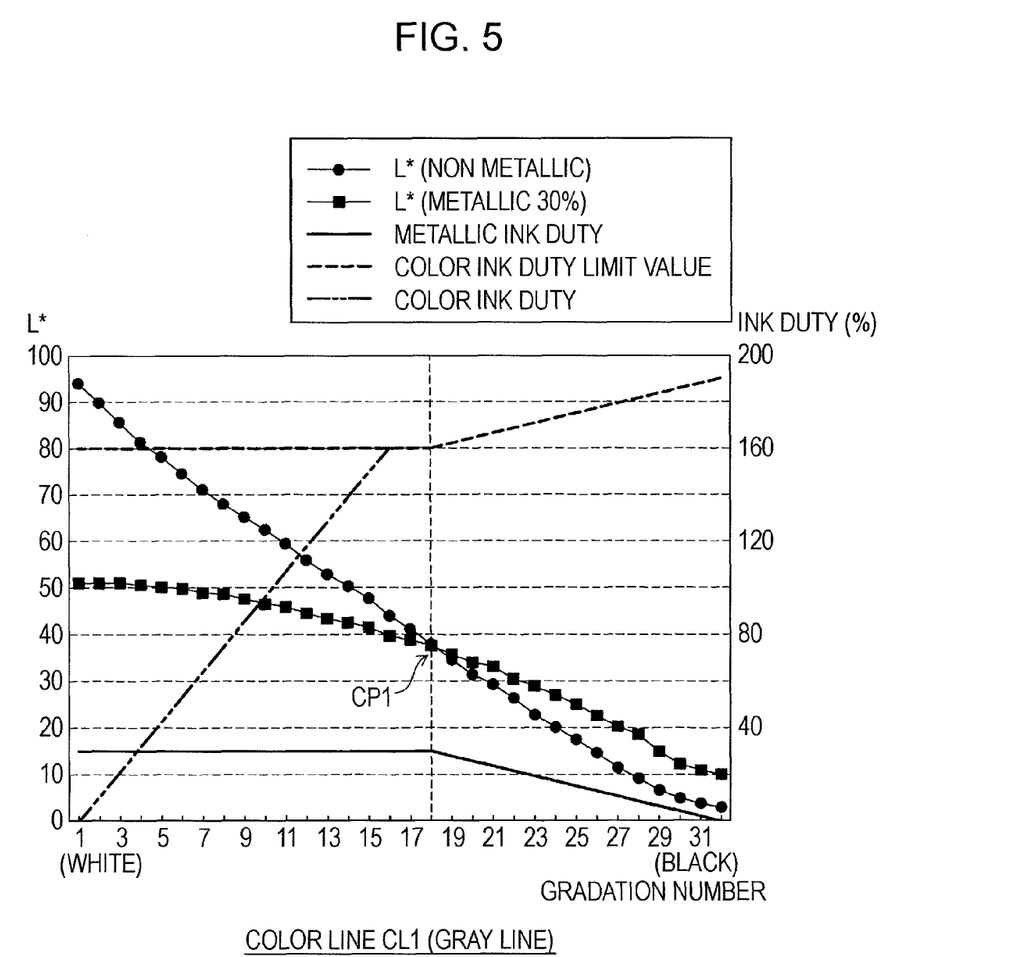
FIG. 5 is an explanatory view showing a relationship between L*, a metallic ink duty, and a color ink duty in a color line CL1.

When L* is measured, the amount to be used (ink duty) of the metallic ink S for each color gradation is set according to the measured L* (Step S230). A method of setting the amount to be used of the metallic ink S will be described in detail with reference to FIG. 5. FIG. 5 shows a relationship between each color gradation for the only color patch ("non metallic" in the figure) and the overlap color patch (metallic 30% in the figure) in the color line CL1 and the L* measured in Step S220. In addition, an ink duty of the metallic ink S set on the basis of the relationship is shown. As illustrated in the figure, with regard to the color line CL1, it can be seen that a line of the only color patch and a line of the overlap color patch intersect at an intersection point CP1 (color gradation number 18).

In this embodiment, the ink duty of the metallic ink S is set to a constant value 30% at a color gradation closer to white that the intersection point CP1, that is, a color gradation having a higher L* than the intersection point CP1. In addition, at a color gradation closer to black than the intersection point CP1, that is, at a color gradation having a lower L* than the intersection point CP1, the ink duty of the metallic ink S is set to be decreased with the decrease in L* and become 0% at black.

If a reduction starting point at which the ink duty of the metallic ink S starts to be reduced is set to a color gradation having a higher L* than the intersection point CP1, at the reduction starting point, L* increases even though the color gradation becomes close to black (in this embodiment, this phenomenon is referred to as a brightness inversion phenomenon). In brief, in other color gradations, L* decreases as the color gradation becomes closer to black, so that a smooth gradation change in L* cannot be realized at the reduction starting point. From this point of view, it is preferable that the reduction starting point be set to a gradation having an L* equal to or lower than the L* of the intersection point CP1, and in this embodiment, the reduction starting point is set to the intersection point CP1.

Figure 6:
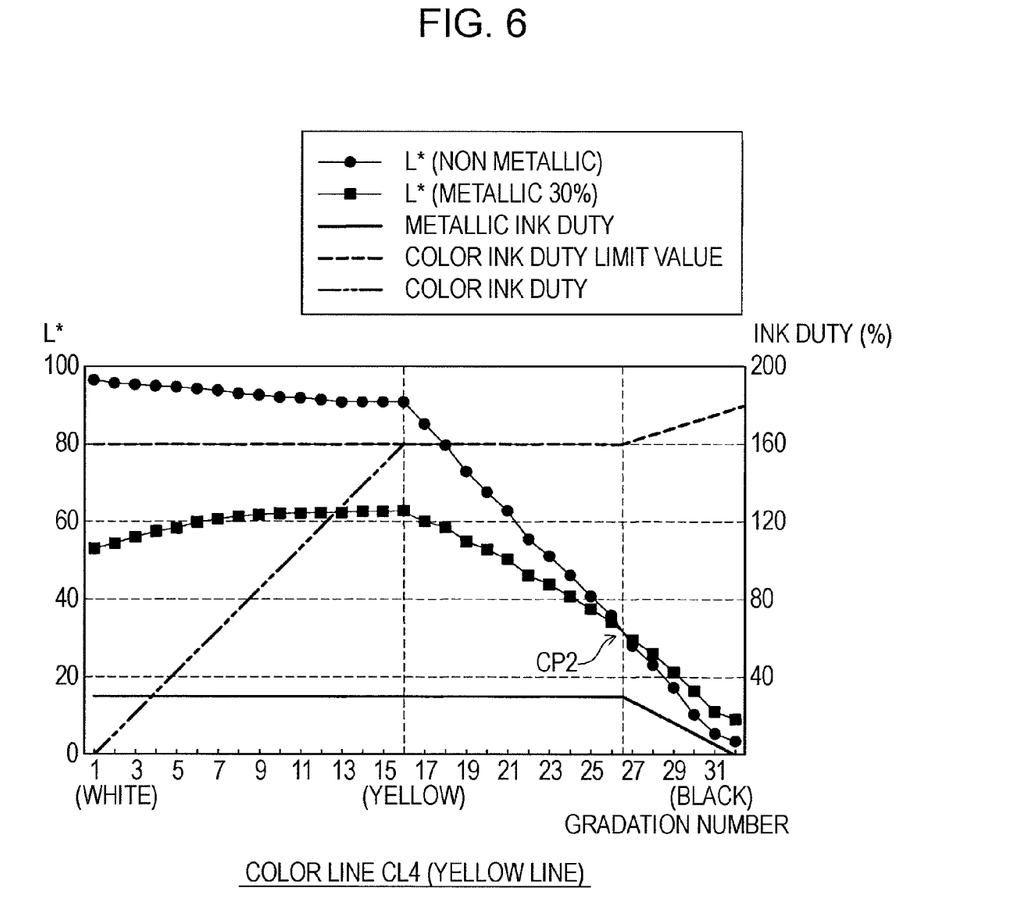
FIG. 6 is an explanatory view showing a relationship between L*, a metallic ink duty, and a color ink duty in a color line CL4.

In the same manner, a relationship between each color gradation and L* in the color line CL4 is shown in FIG. 6. Similarly to the color line CL1, with regard to the color line CL4, it can be seen that a line of the only color patch and a line of the overlap color patch intersect at an intersection point CP2. Therefore, with regard to the ink duty of the metallic ink S, similarly, for a color gradation having an higher L* than that of the intersection point CP2, the ink duty of the metallic ink S is set to a constant value 30%, and for a color gradation having an L* equal to or lower than that of the intersection point CP2, the ink duty of the metallic ink S is set to be decreased with the decrease in L* and become 0% at black. In addition, although description is omitted, the amount of the metallic ink S is set for other color lines in the same manner.

After the amount of the metallic ink S is set as described above, an output value of the metallic ink S is added at each lattice point of the existing LUT on the basis of the amount of the metallic ink S determined in Step S230 (Step S240). Specifically, first, since the color gradation number shown in the horizontal axes of FIGS. 5 and 6 corresponds to the number of color gradation changes of the color patch, the corresponding color gradation number is replaced by a gradation value of the existing LUT to obtain a relationship between the gradation value of the existing LUT and the metallic ink S. Then, an amount of the metallic ink S to be added to each lattice point that belongs to the color lines CL1 to CL7 is obtained on the basis of the obtained relationship. An amount of the metallic ink S of a lattice point that does not belong to the color lines CL1 to CL7 is calculated by an interpolation using the lattice points that belong to the color lines CL1 to CL7. The interpolation may use various well-known methods used for obtaining an output value between lattice points of an LUT. Otherwise, an amount of the metallic ink S may be set by converting an RGB value of each lattice point of an existing LUT into an L*a*b* value and obtaining a relationship between L* shown in FIG. 5 or 6 and an ink duty of the metallic ink S according to the value of L* of each lattice point.

In this embodiment, the configuration in which an amount of the metallic ink S for a lattice point that belongs to the color lines CL1 to CL7 is determined from the relationship between each color gradation and L* is employed. However, the number of set color lines and colors may be suitably set. For example, it is obvious that when the number of color lines is increased, an LUT having higher precision can be created.

When the output value of the metallic ink S is added, the output value of color ink is corrected by increasing the ink duty limit value of color ink according to the added output value of the metallic ink S (Step S250). At the lattice point where the ink duty is reduced from 30%, the ink duty limit value of color ink is increased by the decrement to re-set the output value of color ink.

Step S250 will be described in detail. An example of the ink duty limit value and the ink duty of color ink in the color line CL1 is illustrated in FIG. 5. In this example, the color ink duty is increased as the color gradation goes from white to black, and reaches the ink duty limit value (160%) at a point where the color gradation has a value of 16. Accordingly, when the amount of metallic ink S is fixed to 30% for all color gradations, with regard to color gradations from the value of 16 to black, the ink duty of color ink is set to a constant value of 160% to express a color gradation change. Specifically, a difference in color gradations is expressed by increasing the ratio of the black ink K used.

In this embodiment, the amount of metallic ink S is gradually decreased at a color gradation which becomes closer to black from the intersection point CP1, and the ink duty limit value of color ink is increased by the decrement. As a result, as illustrated in the figure, the color ink duty may be increased up to 190% in a range of color gradations from the intersection point CP1 to black. In addition, in FIG. 5, a portion (from the color gradation value of 16 to black) in which a line (dot-dot-dashed line) of the ink duty limit value of color ink and a line (dashed line) of color ink duty overlap with each other is displayed as the line of color ink duty (dashed line).

Similarly, an example of the color line CL4 is shown in FIG. 6. In this example, the color ink duty is increased as the color gradation goes from white to black and reaches the ink duty limit value of 160% at a point where the color gradation has a value of 16 (yellow). Therefore, in a range of from the color gradation value of 16 to the intersection point CP2, the color ink duty becomes the constant value of 160%. In addition, at a color gradation that is closer to black than the intersection point CP2, the amount of metallic ink S is gradually decreased, and the ink duty limit value of color ink is increased by the decrement.

In this manner, the ink duty limit value of color ink at each lattice point is increased to re-set the output value of color ink. In this embodiment, the output values of cyan ink C, magenta ink M, and yellow ink Y are increased at the same ratio by the increment from the ink duty limit value of 160%. When the output value of color ink is corrected as described above, LUT 62 is completed. In addition, a process of performing color calibration for smooth gradation change may be added to the aforementioned processes.

In the method of creating the LUT 62, the output values of the metallic ink S and the color ink are determined by decreasing the output value of metallic ink S and simultaneously increasing the ink duty limit value of color ink, for a lattice point where L* is dark to be equal to or lower than the predetermined value. Accordingly, at a lattice point where L* is dark, that is, the output value of color ink is relatively high, the ink duty limit value of color ink is increased. Therefore, the output value of color ink is allowed to be high, and as a result, it is possible to widen the color reproduction range of the printing region. In addition, since the amount of color ink to be used is high in the printing area of the corresponding lattice points, a special gloss expression effect due to the metallic ink S is originally small. Therefore, although the output value of the metallic ink S is reduced, this does not have a significant effect on printing quality. In addition, it is possible to conserve the amount of the metallic ink S, which is relatively expensive, while considering the printing quality.

In addition, in the method of creating the LUT 62, the output value of the metallic ink S is reduced and the ink duty limit value of color ink is simultaneously increased with the degree of darkness of L*. Therefore, when printing is performed by using the lookup table created by the method, gradation change in the printed image becomes smooth, and it is possible to suppress the degradation in printing quality.

In addition, in the method of creating the LUT 62, with regard to the color lines CL1 to CL7, the output value of the metallic ink S is determined to reduce the amount of the metallic ink S in a printing region where L* is equal to or less than L* of the intersection point between the line of the only color patch and the line of the overlap color patch. Therefore, when printing is performed using the LUT 62, the degradation in printing quality due to the brightness inversion phenomenon can be solved.

D. Modified Examples

Modified Examples of the embodiment described above will be described.

D-1. First Modified Example

In this example, the configuration in which the amount of the metallic ink S to be used is reduced in a case where a brightness (L*) of color expressed by color ink is equal to or less than a predetermined value is described. However, the index for reducing the amount of the metallic ink S to be used is not limited to brightness and various types of indices relating to color intensity expressed by color ink may be employed. For example, luminance, ink duty, and the like may be employed.

D-2. Second Modified Example

In this example, a reduction point of the metallic ink S is determined by performing color measurement on the color patch. However, the color measurement may not be necessary and may be omitted. Accordingly, the LUT 62 may be created more simply. Here, of course, determining a reduction point of the metallic ink S by performing color measurement as in this embodiment is more preferable, since this can reliably suppress the brightness inversion phenomenon.

The order of determining the output values of color ink and metallic ink S is not limited to the order of the embodiment, and may be suitably determined. For example, the following determining order may be employed. First, the output value of metallic ink S is determined at every lattice point. The output value of metallic ink S is set to be relatively reduced at a color gradation close to black as in the embodiment. It is preferable that the reduction starting point of metallic ink S be set according to experience to be in an empirically predictable range that will not cause a light inversion phenomenon. For example, the output value of metallic ink S may be reduced at a lattice point where any RGB gradation value is equal to or less than 50 as the value becomes closer to black (0, 0, 0).

Next, the ink duty limit value of color ink at each lattice point is determined according to the determined output value of metallic ink S. As in the embodiment, with regard to the ink duty limit value, at a lattice point at which the output value of the metallic ink S is decreased, the ink duty limit value is increased by the decrement. The output value of color ink is determined on the basis of the determined ink duty limit value. A method of determining the output value of color ink may use an existing separation method.

D-3. Third Modified Example

In the aforementioned embodiment, the configuration in which the ink duty of metallic ink S is 30% in the printing region where L* is larger than the reduction point of metallic ink S and the ink duty of the metallic ink S is reduced to zero at black with the decrease in L* from the reduction point of the metallic ink S, is illustrated. However, a method of reducing the ink duty of the metallic ink S may be suitably set in consideration of a printing condition such as a printing medium, required printing quality, an amount of the metallic ink S to be saved, and the like. For example, the upper limit of the ink duty may be set to 25% or 35%, or the ink duty may be set to zero at a point having an L* higher than that of black. Otherwise, a configuration in which the ink duty may be set to, for example, 10% so as not to be zero at black may be employed. This example is not limited to the original configuration of reducing the amount of the metallic ink S to be used by the decrement in L*, and a configuration of reducing the amount by a predetermined amount in a printing region equal to or less than the reduction point may be employed. In this case, a certain degree of effect can be expected with a simple configuration.

D-4. Fourth Modified Example

In the embodiment described above, the configuration in which printing of metallic color is performed using metallic ink and color ink is exemplified. However, the embodiment of the invention is not limited to the printing of metallic color, and may be applied to printing using color ink and various special gloss inks The special gloss ink is ink for expressing a special gloss on a surface of a printed matter subjected to printing and may include ink which has optical characteristics in which ink printed on a surface of a printed matter is reflection angle-dependent and shows in various directions at different angles, as well as metallic ink containing pigments for expressing a metallic feel. Such ink may employ, specifically, in addition to the metallic ink, pearly gloss ink containing pigments for expressing a pearly gloss feel after being fixed on a surface of a medium, lame ink or pear-skin ink containing pigment having minute convexes and concaves to express a so-called lame feel or pear-skin feel by generating diffused reflection after being fixed on a surface of a medium, or the like.

D-5. Fifth Modified Example

In the embodiment described above, the printer 20 has a configuration for executing the entire printing process in FIG. 2. However, in a case where the printer 20 is connected to a computer, the computer may execute parts of the printing process. In this case, a printing system configured by the computer and the printer 20 may be recognized as a printing apparatus in a broad sense.

While the embodiments of the invention have been described above, the invention is not limited to the embodiments and can be modified in various manners without departing from the spirit and scope of the invention. In addition, the invention can also be embodied as a printing apparatus, an LUT, a printing method, and the like, as well as a method of creating an LUT.

The disclosure of Japanese Patent Application No. 2009-004902 filed Jan. 13, 2009 including specification, drawings and claims is incorporated herein by reference in its entirety.

What is claimed is:

1. A method of creating a lookup table which describes a correspondence relationship between an input value to a printing apparatus for performing printing by ejecting ink onto a printing medium, and output values of a special gloss ink and a color ink of the printing apparatus, the printing apparatus comprising a processor and a non-transitory computer readable medium storing the lookup table and code executable by the processor to implement the method, the method comprising:
   in a first process, determining the output value of the special gloss ink to be low at a lattice point where an index value relating to color intensity is dark to be equal to or lower than a predetermined value, with regard to each lattice point of the lookup table; and
   in a second process, determining the output value of the color ink at each lattice point by increasing an ink duty limit value which is an upper limit of the sum of the color ink that can be ejected onto a unit area of the printing medium, according to the determined output value of the special gloss ink.

2. The method according to claim 1,
   wherein in the first process, the output value of the special gloss ink is reduced at a lattice point where the index value is dark to be equal to or lower than the predetermined value, as the index value is darker, and
   in the second process, the ink duty limit value is increased as the index value is darker.

3. The method according to claim 1, further comprising;
   in a first color measurement process, performing color measurement on the index value for each predetermined color gradation in a printing region printed by using only the color ink;
   in a second color measurement process, performing color measurement on the index value for each predetermined color gradation in a printing region printed by using the color ink and the special gloss ink; and
   obtaining an intersection index value which is the index value at an intersection between a line representing a relationship between the color gradation and the index value obtained in the first color measurement process and a line representing a relationship between the color gradation and the index value obtained in the second color measurement process,
   wherein the predetermined value is a dark value to be equal to or less than the intersection index value.

4. The method according to claim 1, wherein the index value is brightness.

5. The method according to claim 4, wherein the brightness is a value measured at a light-receiving angle of 0 degrees and an illumination angle of -45 degrees.

6. A printing apparatus comprising:
   a storage unit that stores the lookup table created by the method of creating a lookup table according to claim 1;
   a color conversion unit that performs a color conversion process of converting the input value into the output value by using the stored lookup table; and
   a print unit that performs printing by using a result of the color conversion process.

7. A non-transitory computer-readable medium storing a lookup table which describes a correspondence relationship between an input value to a printing apparatus for performing printing by ejecting ink onto a printing medium and output values of a special gloss ink and a color ink of the printing apparatus, wherein the output value of the special gloss ink is relatively reduced, and the sum of the output value of the color ink is increased at a lattice point where an index value relating to color intensity is dark to be equal to or lower than a predetermined value.

8. A printing method of performing printing using a special gloss ink and a color ink in a printing apparatus, the printing apparatus comprising a processor and a non-transitory computer readable medium, the non-transitory computer readable medium storing code executable by the processor to perform the printing method comprising;
   in a printing region where an index value relating to color intensity is dark to be equal to or lower than a predetermined value,
   reducing an amount of the special gloss ink to be used; and
   increasing the sum of an amount of the color ink to be used.

* * * * *